Figure 1:
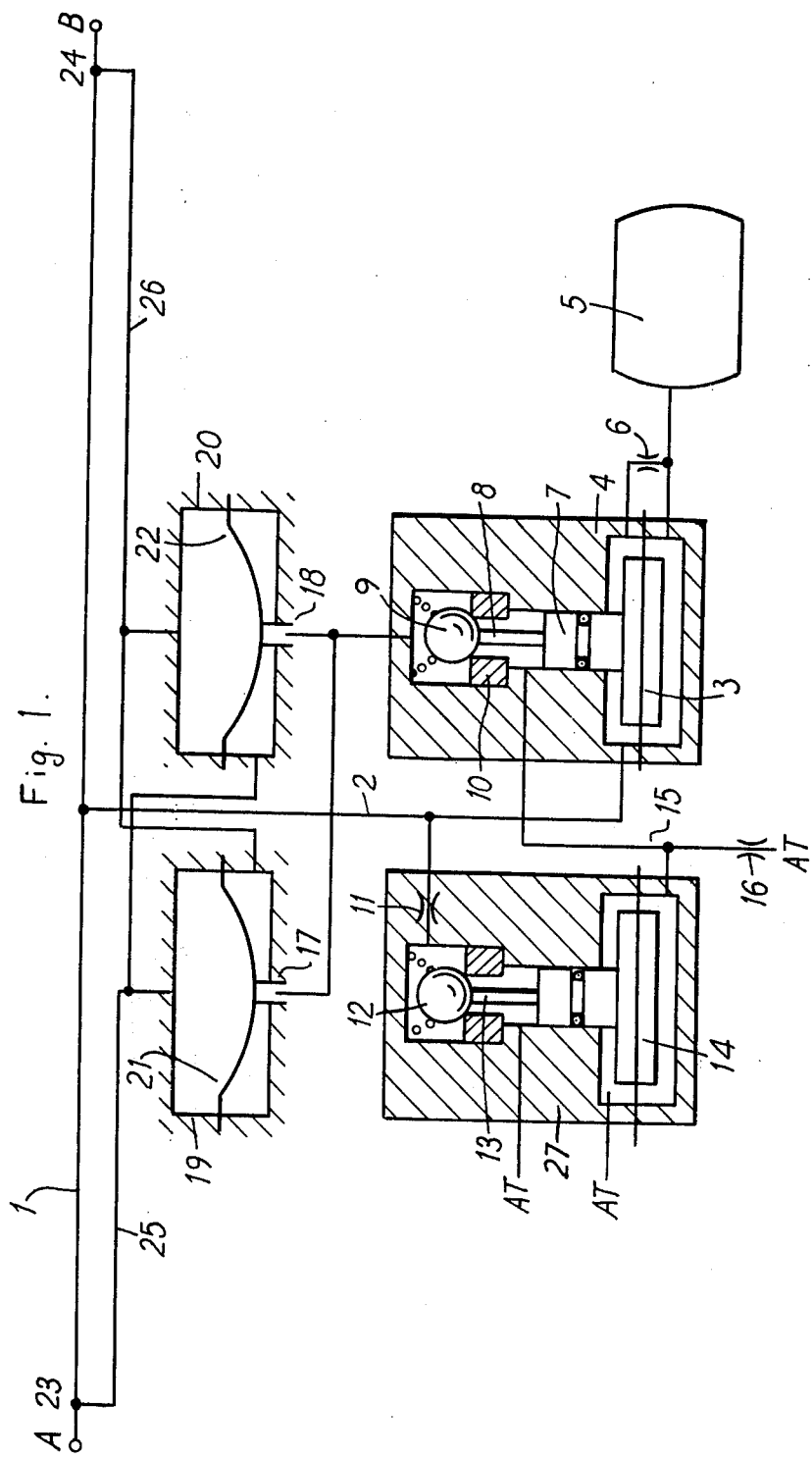

United States Patent [19]

Wickham

[11] 4,043,606
[45] Aug. 23, 1977

[54] RAIL VEHICLE BRAKE PIPE VALVE ARRANGEMENT HAVING A FLUID PRESSURE DROP DETECTOR AND A VENT VALVE CONTROLLED THEREBY FOR BRAKE PIPE PRESSURE GRADIENT REDUCTION

[75] Inventor: David John Wickham, London, England

[73] Assignee: Westinghouse Brake & Signal Co. Ltd., Chippenham, England

[21] Appl. No.: 664,873

[22] Filed: Mar. 8, 1976

Related U.S. Application Data

[63] Continuation-in-part of Ser. No. 513,398, Oct. 9, 1977, Pat. No. 3,966,272.

[30] Foreign Application Priority Data

Mar. 27, 1975 United Kingdom ............... 13016/75

[51] Int. Cl.$^2$ ............................................. B60T 17/04
[52] U.S. Cl. ......................................... 303/82; 303/86

[58] Field of Search ............................. 303/81, 28–30, 303/82, 86, 36, 68, 69; 188/153 R

[56] References Cited

U.S. PATENT DOCUMENTS

| | | | |
|---|---|---|---|
| 1,969,812 | 8/1934 | McCune | 303/82 |
| 1,993,940 | 3/1935 | Moller et al. | 303/82 |
| 3,707,314 | 12/1972 | Paginton | 303/69 X |
| 3,966,272 | 6/1976 | Wickham | 303/81 |

Primary Examiner—Trygve M. Blix
Assistant Examiner—Douglas C. Butler
Attorney, Agent, or Firm—Larson, Taylor and Hinds

[57] ABSTRACT

A railway air brake pipe pressure gradient reduction arrangement, wherein pressure gradients along the pipe indicative of a brake pipe pressure fall activate a valve arrangement to temporarily vent the pipe and so speed the brake applying pressure reduction. A further valve arrangement is included for inhibiting venting when a pressure gradient is present due to a pressure rise.

8 Claims, 2 Drawing Figures

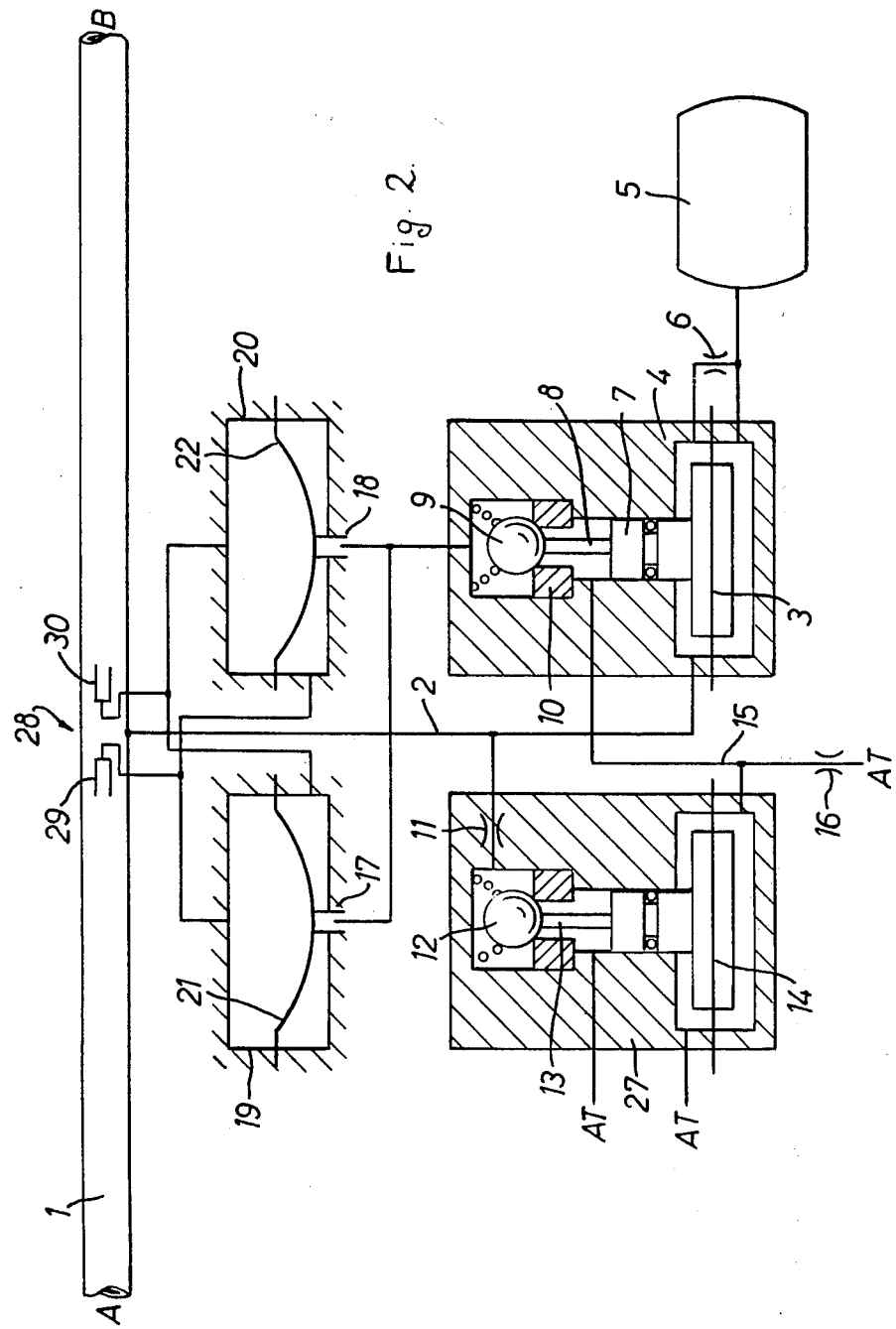

RAIL VEHICLE BRAKE PIPE VALVE ARRANGEMENT HAVING A FLUID PRESSURE DROP DETECTOR AND A VENT VALVE CONTROLLED THEREBY FOR BRAKE PIPE PRESSURE GRADIENT REDUCTION

This application is a continuation-in-part of Ser. No. 513,398 filed Oct. 9, 1974 which is now U.S. Pat. No. 3,966,272.

This invention relates to rail vehicle braking systems and relates especially to improvements to such systems as applied to a train of vehicles.

In rail vehicle braking systems it has become established practice to employ air under pressure in a brake pipe running the length of a train as the control means whereby brakes are applied and released. More specifically, it has been preferable to establish a system pressure a decrease in which in the brake pipe gives rise to a brake application and a subsequent recovery of which pressure permits the release of the brakes.

The use of air under pressure for control of the brakes in the above manner has certain shortcomings in a long train of vehicles because not only can the rate of propagation of an air pressure signal be no greater than the speed of sound but more significantly, where the system relies upon a reduction of brake pipe pressure by transmitting air from one end of the train to another through the brake pipe, the resistance to such flow of air through the brake pipe can induce substantial delays between the operation of the brakes on spaced vehicles of the train.

In my U.S. Pat. No. 3,966,272, of which the instant application may be considered a continuation-in-part there is described a proposal the object of which was to reduce the above shortcoming.

In the said patent there is described an arrangement for improving brake signal propagation in a brake pipe in a rail vehicle braking system, the arrangement including an valve and a fluid flow sensor connected into a section of a brake pipe and to be responsive to flow rate in the brake pipe, said valve being responsive to the flow sensor to effect enhancement of a brake pipe pressure change produced by flow therein.

It is also proposed in the earlier patent that flows may be sensed by observing pressure differences across a sufficient length of brake pipe.

According to the present invention there is provided an improved pressure gradient reducing valve arrangement operable for use as an air flow sensor and air vent means in a railway air braking system and including a fluid pressure fall detector having a pressure responsive device which operates a first valve means to transmit a fluid pressure control signal to control a second valve means functioning as a vent valve to vent a length of brake pipe, the fluid pressure control signal being derived from the brake pipe via a third valve means operable to inhibit such a signal in the absence of pressure gradient over the length of brake pipe.

In order that the invention may be more clearly understood and readily carried into effect, the same will be further described by way of example with reference to the accompanying drawings.

FIG. 1 of which illustrates in diagrammatical schematic form, a pressure gradient reducing valve arrangement in accordance with one embodiment of the invention, and FIG. 2 of which illustrates in diagrammatical schematic form, a pressure gradient reducing valve arrangement in accordance with another embodiment of the invention.

The apparatus shown in FIG. 1 is intended for use on one vehicle of a long train of rail vehicles and it is assumed that further such apparatus is incorporated on further vehicles distributed along the train in order to provide for rapid propagation of fluid pressure drop in the brake pipe. In FIG. 1 the brake pipe on the particular rail vehicle under consideration is denoted by the line 1 and from a point close to the central point of the brake pipe, there is a small bore connection 2 which communicates with one side of a pressure responsive member 3 of a first valve means in the form of a fluid pressure drop detector 4. The pipe 2 also communicates with the underside of the pressure responsive member 3 and a reservoir 5 via a choke 6. The pressure responsive member 3 is carried in the body of the pressure drop detector 4 by means of a sealingly slideable stem 7 which has an extension 8 beyond which a spring loaded ball valve 9 is provided and which ball valve can be lifted from its seat 10 by upward movement of the stem 7 instanced by a sufficient pressure differential across the pressure responsive member 3. The communication 2 also connects via a suitable restriction 11 with one side of a further ball valve 12 which is operable by the stem 13 of a similar pressure responsive member 14 of a second valve means comprising a vent valve in the form of a relay valve 27 which from a constructional point of view may be substantially identical to the pressure drop detector 4. The lower chamber beneath the pressure responsive member 14 is connected via a passage 15 to a region beneath the ball valve 9 and also via a restriction 16 to atmosphere. The upper chamber above the pressure responsive member 14 is also connected to atmosphere as also is the underside of the ball valve 12. The side of the ball valve 9 of the pressure drop detector 4 which is remote from the pressure responsive member 14 of the relay valve, is connected to output ports 17 and 18 of third and fourth valve means in the form of respective first and second chambers each divided into two separate parts by flexible diaphragms 21 and 22 respectively. The diaphragms 21 and 22 each normally seal off the respective output ports 17 and 18 by being biassed thereagainst. Such sealing-off of the output ports 17 and 18 may optionally be spring assisted by light springs (not shown) disposed above the diaphragms. Inputs to the respective sides of the diaphragms 21 and 22 are derived from points such as 23 and 24 where small bore connections 25 and 26 are provided to the brake pipe 1 close to the ends of the vehicle. The point 23 is connected above diaphragm 21 and below diaphragm 22 and the point 24 is connected above diaphragm 22 and below diaphragm 21, the existence of pressure differences across the brake pipe thereby oppositely influencing the respective diaphragm.

In operation of the arrangement, it will be assumed that the brake pipe 1 is a continuous brake pipe connecting the driver's brake valve on the locomotive disposed at one end say beyond the end A of the brake pipe 1 to subsequent vehicles connected at the point B to the other end of the brake pipe. The brake pipe is therefore a continuous transmission pipe passing the full length of the train and reductions in brake pipe pressure are such as to operate brake control apparatus on each vehicle to apply the brakes whereas increases of brake pipe pressure to a normal operating level maintain the brakes in the released position. Assuming that the apparatus is initially unpressurised, on placing the driver's brake valve to the brake released position after marshalling of the train, will charge up the system to its normal regime pressure by the transmission of air down the brake pipe from A to B and thence to subsequent vehicles on the train. The effect of such a pressure on attaining the regime value is to charge the respective reservoirs in the braking equipment which is not shown and also to charge the reservoir 5 via the pipe 2 and the choke 6. Under steady conditions therefore the valves 9 and 12 rest in the position shown and the air pressures above and below the pressure responsive member 3 are equal to the fully charged pressure of the reservoir 5 whereas the pressures above and below the pressure responsive member 14 are atmospheric pressure.

Assuming that for the purposes of achieving a brake application, a pressure drop of brake pipe pressure is effected at A for transmission down the train to all the brake equipment thereon, there is a reduction of brake pipe pressure sensed in the pipe 2 and due to the presence of the choke 6, the pressure in the reservoir 5 has the effect of deflecting the pressure responsive member 3 against the reduced brake pipe pressure above the pressure responsive member 3 to unseat the ball valve 9. Due moreover to the reduction of brake pipe pressure at A relative to that at B during propagation of a brake pipe pressure reduction, the diaphragm 21 is deflected thereby opening the port 17 of the diaphragm valve 19 to the pressure at the point 24 and therefore air is permitted to flow from the brake pipe from the point 24 via the diaphragm valve 21, the port 17, the unseated ball valve 9, the passage 15 to the underside of the pressure responsive member 14 which is thereby temporarily deflected upwards to unseat the ball valve 12. There is therefore provided a flow path for air from the brake pipe via the passage 2, the restriction 11 and the unseated valve 12 of the relay valve to atmosphere. The overall result is a rapid propagation of the pressure drop which is initially effected at A, to take place over the length of brake pipe 1 and as soon as there is a sufficient fall of brake pipe pressure at 24 relative to that at 23, indicating the substantial removal of pressure gradient between A and B, the diaphragm 21 returns to its position in engagement with the output port 17 of the diaphragm valve 19 and the path for the transmission of air to the underside of the pressure responsive member 14 of the relay valve, is interrupted. Remanant fluid pressure beneath the member 14 is thus rapidly discharged via the restriction 16 to atmosphere and the relay valve 12 closes interrupting the dissipation of brake pipe air pressure to atmosphere. Further, under these conditions the pressure gradient across the pressure responsive member 3 disappears via the choke 6 and the valve 9 returns to its seat.

By virtue of the arrangement described above, the rate of propagation of brake pipe pressure changes over the length of a long train can be appreciably accelerated thereby substantially reducing time delays which can occur between the application of brakes on spaced cars in a long train. In order to achieve this, it will be appreciated that it is necessary to provide similar such equipments at more closely spaced points along the train.

By providing the diaphragm valve 20 connected to be operable in the opposite sense to the valve 19, the arrangement operates equally well regardless of whether the control is from point B or from point A.

When the brake pipe pressure in the brake pipe 1 is increased from A by operation of the driver's brake valve to release a brake application, it will be appreciated that there is at the start of such an operation a predominance of brake pipe pressure beneath the diaphragm 22 of the diaphragm valve 20 such as to unseat the diaphragm 22 from the output port 18. However, under such conditions, the pressure responsive member 3 of the pressure drop detector 4, remains in a downwardly deflected position owing to the predominance of brake pipe pressure in the pipe 2 over the slightly lower pressure in the reservoir 5 and which is present beneath the pressure responsive member 3. The ball valve 9 therefore remains seated and the apparatus is therefore unresponsive to such increases of brake pipe pressure and no dumping of brake pipe air occurs during a brake releasing operation from A. The same is true with an increase of pressure from B. This also applies during the subsequent period when the brake pipe pressure is maintained at a steady value against leakage, by flow from the driver's brake valve, since although there will be a pressure gradient along the pipe 1 due to said leakage flow, thus opening the port 18 to deliver a pressure signal to the valve 9, this pressure signal will not be transmitted to the pressure responsive member 14 because the valve 9 remains seated due to a steady, unchanging pressure being sensed by the pipe 2 leading to equal pressures on either side of the pressure responsive member 3.

As a practical alternative to the arrangement described and to eliminate the need for piping such as 25 and 26, an opposed type pitot tube arrangement as shown in FIG. 2. A pitot head 28 is located within the brake pipe 1, and has a first pressure sensing element 29 pointing to the left in the brake pipe 1, and a second pressure sensing element 30 pointing to the right in the brake pipe 1. The element 29 is connected to the third and fourth valve means 19 and 20 in place of the connection 25, and the element 30 is connected to the third and fourth valve means 19 and 20 in place of the connection 26. The pitot head 28 with its opposed pressure sensing elements 29 and 30 is sensitive to the pressure differential along the pipe, and the coupling of the elements 29 and 30 to the third and fourth valve means 19 and 20 provides an arrangement which functions as does the arrangement of FIG. 1.

Having thus described our invention what we claim is:

1. A rail vehicle brake pipe pressure gradient reducing valve arrangement comprising a first valve means functioning as a brake pipe fluid pressure-drop detector, a second valve means in the form of a relay valve and functioning as a brake pipe vent valve, and a third valve means functioning as a pressure signal deriving means, the first valve means being coupled to the brake pipe to sense a fluid pressure-drop therein due to a pressure reduction in the brake pipe, the third valve means being coupled to the brake pipe to derive a pressure signal from fluid flow therealong, the first valve means being coupled to the second valve means and to the third valve means so as in response to the sensed fluid-pressure drop to deliver the derived pressure signal from the third valve means to the second valve means, the second valve means being responsive to the delivered pressure signal to vent the brake pipe to atmosphere to augment the rate of pressure drop and to tend to reduce the pressure gradient therein, venting operation of the second valve means being inhibited by the first valve means sensing a steady pressure when a steady pressure gradient exists such as may be caused by leakage from the brake pipe or by sensing a rising pressure during re-charging of the brake pipe, venting operation of the second valve means also being inhibited by the third valve means being responsive to absence of a pressure gradient along the brake pipe to derive a zero pressure signal.

2. An arrangement according to claim 1 wherein the third valve means comprises a first chamber divided into first and second separate parts by a first flexible diaphragm, the first part being coupled to a first end of the brake pipe, and the second part being coupled to a second end of the brake pipe, said first and second ends being opposite ends of the brake pipe, the third valve means having a first output port coupled to said first part, said first output port normally being sealed off from said first part by the first diaphragm being biassed against said first output port, said first output port being coupled to the first valve means.

3. An arrangement according to claim 2 including a fourth valve means comprising a second chamber divided into third and fourth separate parts by a second flexible diaphragm, said third part being coupled to the second end of the brake pipe, and said fourth part being coupled to the first end of the brake pipe, the fourth valve means having a second output port coupled to said third part, said second output port normally being sealed off from said third part by the second diaphragm being biassed against said second output port, said second output port being coupled to the first valve means together with said first output port.

4. An arrangement according to claim 1 including a tapping to a point in the brake pipe intermediate the ends thereof, the tapping being coupled via the first valve means and a choke to a reservoir for storing brake pipe pressure, the reservoir being coupled to the first valve means in a sense to inhibit the first valve means from delivering the derived pressure signal from the third valve means to second valve means to thereby inhibit venting of the brake pipe during times of rising pressure in the brake pipe.

5. An arrangement according to claim 4 wherein said tapping is coupled to a valve portion of the second valve means by way of a choke, said valve portion being normally biassed closed and when open, coupling the tapping by way of the choke to an atmospheric vent.

6. An arrangement according to claim 1 wherein there is a coupling from a valve portion of the first valve means to a relay portion of the second valve means, said coupling also leading to an atmospheric vent via a choke.

7. An arrangement according to claim 6 wherein said valve portion of the first valve means is coupled to the third valve means, and said valve portion is normally biassed closed, but when open allows fluid flow from the third valve means to the relay portion of the second valve means and to the atmospheric vent via said choke.

8. An arrangement according to claim 1 wherein the coupling of the third valve means to the brake pipe is by way of a pitot head having two pressure sensing elements located within the brake pipe, the elements pointing in opposite directions in the brake pipe and being differentially coupled to the third valve means to sense pressure differential along the brake pipe.

* * * * *